(12) United States Patent
Jogand-Coulomb et al.

(10) Patent No.: US 7,725,614 B2
(45) Date of Patent: May 25, 2010

(54) PORTABLE MASS STORAGE DEVICE WITH VIRTUAL MACHINE ACTIVATION

(75) Inventors: Fabrice Jogand-Coulomb, San Carlos, CA (US); Bahman Qawami, San Jose, CA (US); Farshid Sabet-Shargi, Los Altos Hills, CA (US); Carlos J. Gonzalez, Los Gatos, CA (US)

(73) Assignee: SanDisk Corporation, Milpitas, CA (US)

( * ) Notice: Subject to any disclaimer, the term of this patent is extended or adjusted under 35 U.S.C. 154(b) by 224 days.

(21) Appl. No.: 11/463,256

(22) Filed: Aug. 8, 2006

(65) Prior Publication Data

US 2008/0082447 A1 Apr. 3, 2008

(51) Int. Cl.
| | |
|---|---|
| G06F 3/00 | (2006.01) |
| G06F 13/12 | (2006.01) |
| H05K 7/10 | (2006.01) |
| G06F 12/06 | (2006.01) |
| G06F 13/00 | (2006.01) |
| G06F 9/455 | (2006.01) |
| G06F 7/04 | (2006.01) |

(52) U.S. Cl. .................. 710/8; 711/100; 718/1; 713/2; 710/74; 710/301; 726/2
(58) Field of Classification Search .......... None
See application file for complete search history.

(56) References Cited

U.S. PATENT DOCUMENTS

| | | | |
|---|---|---|---|
| 6,005,942 A | 12/1999 | Chan et al. | |
| 6,442,475 B1 | 8/2002 | Utsui et al. | |
| 6,772,955 B2 | 8/2004 | Yoshimoto et al. | |
| 7,036,020 B2 | 4/2006 | Thibadeau | |

(Continued)

FOREIGN PATENT DOCUMENTS

WO WO 2004/070728 8/2004

(Continued)

OTHER PUBLICATIONS

"Content Protection for Recordable Media Specification: SD Memory Card Book, Revision 0.95", http://wwvv.4centity.com/docs/versions.html, pp. 1-75, May 2001.

(Continued)

*Primary Examiner*—Alan Chen
(74) *Attorney, Agent, or Firm*—Brinks Hofer Gilson & Lione (57) ABSTRACT

A portable mass storage device is used to store large files such as digital pictures, movies and music. The mass storage device has firmware with security mechanisms that limit access to read write operations to ensure reliable operation of the device to prevent unwanted copying or storing of secure content such a copyrighted material. Although the security mechanisms generally limit access, the firmware is operable to work with a virtual machine and allows the virtual machine to access the secure content and work in conjunction with the firmware to read and write data to the mass storage memory, if the virtual machine is present. The virtual machine is either loaded but not activated at the time of manufacture, or is downloaded and activated post manufacture. Any royalty for the virtual machine is paid for only if and when the virtual machine is both present and activated in the device.

5 Claims, 11 Drawing Sheets

U.S. PATENT DOCUMENTS

| | | | |
|---|---|---|---|
| 7,215,771 | B1 | 5/2007 | Hamlin |
| 7,426,747 | B2 | 9/2008 | Thibadeau |
| 7,493,656 | B2 | 2/2009 | Goodwill et al. |
| 2002/0145632 | A1 | 10/2002 | Shmueli et al. |
| 2006/0106845 | A1 | 5/2006 | Frank et al. |
| 2006/0177064 | A1 | 8/2006 | Holtzman et al. |
| 2007/0061597 | A1 | 3/2007 | Holtzman et al. |
| 2007/0061897 | A1 | 3/2007 | Holtzman et al. |
| 2007/0074050 | A1* | 3/2007 | Camiel ................ 713/193 |
| 2007/0150884 | A1 | 6/2007 | Jogand-Coulomb |
| 2007/0150885 | A1 | 6/2007 | Jogand-Coulomb |
| 2007/0180539 | A1 | 8/2007 | Holtzman et al. |
| 2007/0266063 | A1 | 11/2007 | Camiel |
| 2008/0229428 | A1 | 9/2008 | Camiel |

FOREIGN PATENT DOCUMENTS

| | | |
|---|---|---|
| WO | WO 2005/076576 | 8/2005 |
| WO | WO 2006/095335 | 9/2006 |

OTHER PUBLICATIONS

International Search Report and Written Opinion for PCT/US2007/074399, dated Apr. 16, 2008, 17 pages.

Haller, N. et al., "A One Time Password System", *IETF Standard-Working-Draft, Internet Egineering Task Force, IETF, CH*, vol. OTP, No. 1, pp. 1-22, Mar. 1997.

U.S. Appl. No. 11/463,264 entitled, "Methods Used in a Portable Mass Storage Device with Virtual Machine Activation", filed on Aug. 8, 2006.

"SDMI Secure Digital Music Initiative", *SDMI Portable Device Specification Version 1.0*, No. Part 1, pp. 1-35, Jul. 1999.

* cited by examiner

| COMPONENT | PRIMARY ROLE |
|---|---|
| • End Entity | End Entity is a generic term used to denote end-users, devices. (e.g., servers, routers), or any other entity that can be identified in the subject field of a public key certificate. End entities typically consume and/or support PKI-related services. |
| • Certification Authority (CA) | The CA is the issuer of certificates and (usually) CRLs. It may also support a variety of administrative functions, although these are often delegated to one or more Registration Authorities. |
| • Registration Authority (RA) | The RA is an optional component that can assume a number of administrative functions from the CA. The RA is often associated with the End Entity registration process, but can assist in a number of other areas as well. |
| • Repository | A repository is a generic term used to denote any method for storing certificates and CRLs so that they can be retrieved by End Entities. |
| • CRL Issuer | The CRL Issuer is an optional component that a CA can delegate to publish CRLs. |

PORTABLE MASS STORAGE DEVICE WITH VIRTUAL MACHINE ACTIVATION

CROSS REFERENCE TO RELATED APPLICATIONS

The present invention is related to U.S. patent application Ser. No. 11/463,264, entitled "Methods Used In A Portable Mass Storage Device With Virtual Machine Activation" to Jogand-Coulomb et al. The present invention is also related to U.S. patent application Ser. No. 11/317,339 entitled "Secure Yet Flexible System Architecture for Secure Devices With Flash Mass Storage Memory" to Holtzman et al.; and U.S. patent application Ser. No. 11/285,600 entitled "Hardware Driver Integrity Check of Memory Card Controller Firmware" to Holtzman et al.; and U.S. patent application Ser. No. 11/314,032 entitled "Memory System With In Stream Data Encryption/Decryption" to Holtzman et al., which are hereby incorporated by this reference in the entirety for all purposes.

FIELD OF THE INVENTION

The present invention relates generally to portable mass storage devices and the firmware and software that runs on the devices, and more specifically to providing the software and other content and activating and paying for the same.

BACKGROUND OF THE INVENTION

Smart Cards have been around for quite some time and are used frequently as debit and credit cards, among other things. Smart Cards, as the name implies, are processor controlled and also include a small amount of memory to retain identification and transactional related data. The ability to create and run Java based programs on Smart Cards has recently been developed and is gaining popularity. Java based programs can also be implemented in other intelligent devices, such as the mass storage memory cards typically used in digital cameras and music players. These other cards are recognized as mass storage devices because they must store and access very large libraries of data, such as photos and music, orders or magnitude larger than the transactional and identification data stored in a Smart Card. Examples of these mass storage cards are the compact flash ("CF") card, secure digital ("SD") card, mini SD card, micro SD card, multimedia ("MMC") card, and memory stick. There are many more different formats of mass storage cards in addition to the recited examples. Portable flash memory based universal serial bus ("USB") drives are another type of portable mass storage device.

Java Card™ technology enables programs written in the Java programming language to be run on smart cards and other small, resource-constrained devices. Developers can build and test programs using standard software development tools and environments, then convert them into a form that can be installed onto a Java Card™ technology-enabled device. Application software for the Java Card™ platform is called an applet, or more specifically, a Java Card™ applet or card applet (to distinguish it from browser applets).

While Java Card™ technology enables programs written in the Java programming language to run on small memory cards, such small devices are far too under-powered to support the full functionality of the Java platform. Therefore, the Java Card™ platform supports only a carefully chosen, customized subset of the features of the Java platform. This subset provides features that are well-suited for writing programs for small devices and preserves the object-oriented capabilities of the Java programming language.

Java Card™ is one type of virtual machine. Other virtual machines are also available, and a virtual machine is an abstraction of a physical processor and has virtual counterparts of a conventional processor. In the case of the Java language, a Java virtual machine is software that acts as an interface between compiled Java binary code and the underlying hardware platform microprocessor.

One application that would be particularly useful when implemented in such a small device involves payment for protected content such as music or movies etc. . . .

In order to run applications written in Java, the Java Card™ virtual machine must be loaded into the card and activated. Each instance of the machine requires payment of a license fee to Sun or to the supplier of such components. Because the main purpose of a Smart Card is transactional, the cost of the license fee is acceptable to the issuer of the card as a cost of doing business. However, the user of a memory card of the mass storage type may or may not have a use for the additional applications that the virtual machine makes possible, because the typical user possesses and uses the card primarily for the purpose of data storage. Therefore, the manufacturer cannot pass-on or absorb the cost of the license fee as a matter of course. Furthermore, each of the applets or other programs that run on the virtual machine(s) may also require a license fee that cannot be passed on (to a user that may have no use for it), or absorbed as a matter of course.

The role of the Java Card™ virtual machine is best understood in the context of the process for production and deployment of software for the Java Card™ platform. There are several components that make up a Java Card™ system, including the Java Card™ virtual machine, the Converter for the Java Card™ platform ("Java Card™ Converter"), a terminal installation tool, and an installation program that runs on the device. Development of a Java Card™ applet begins as with any other Java program: a developer writes one or more Java classes, and compiles the source code with a Java compiler, producing one or more class files. The applet is run, tested and debugged on a workstation using simulation tools to emulate the device environment. Then, when an applet is ready to be downloaded to a device, the class files comprising the applet are converted to a CAP (converted applet) file using a Java Card™ Converter. The Java Card™ Converter takes as input all of the class files which make up a Java package. The Java Card™ Converter also takes as input one or more export files. An export file contains name and link information for the contents of other packages that are imported by the classes being converted. When an applet or library package is converted, the converter can also produce an export file for that package.

Normally, after conversion, the CAP file is copied to a card terminal, such as a desktop computer with a card reader peripheral. Then an installation tool on the terminal loads the CAP file and transmits it to the Java Card™ technology-enabled device. An installation program on the device receives the contents of the CAP file and prepares the applet to be run by the Java Card™ virtual machine. The virtual machine itself need not load or manipulate CAP files; it need only execute the applet code found in the CAP file that was loaded onto the device by the installation program.

These and other aspects of the Java Card™ Platform are described in the following specifications from Sun Microsystems, which are hereby incorporated by reference in their entirety: Application Programming Interface, Java Card™ Platform, Version 2.2.1; Runtime Environment Specification, Java Card™ Platform, Version 2.2.1; and Virtual Machine Specification, Java Card™ Platform, Version 2.2.1.

As mentioned above in order to run applications written in Java, the Java Card™ virtual machine must be loaded into the card and activated.

In one prior approach described in U.S. Pat. No. 6,772,955 to Yoshimoto et al., a virtual machine is provided as part of the memory card controller chip in order for the card to be used in point based transactions. The source code for employing the card as a point card is written in Java and is loaded into the card. A point balance is updated for each item purchased with the card.

Each instance of the Java Virtual Machine requires payment of a license fee to Sun or other suppliers. Similarly any other proprietary virtual machine may require payment to the licensor of such a machine. In a Smart Card, each card is provided with an active and paid copy of the Java Card™ virtual machine. This adds to the cost of each Smart Card, as it likely does to the system described in the Yoshimoto patent. Because the Smart Card's principle function is transactional in the majority of applications, this cost can be absorbed and/or passed on to the manufacturer, middleman, or consumer. However, it is undesirable to absorb or pass on the cost of the license in a consumer mass storage device, where the functionality of the virtual machine may never be utilized.

Global Platform is an industry consortium for the advancement and standardization of Smart Cards. Global Platform acts as a smart card industry standards body, creating and maintaining an open technology framework for the global deployment of smart card programs by many service providers across many industries. The Global Platform application programming interface ("API") and other aspects of the Global Platform are described in The Global Platform Card Specification. V. 2.1.1 and the Formal Specification of Global Platform Card Security Requirements, dated December 2004, which are available at www.globalplatform.com and hereby incorporated by reference in their entirety. Global Platform provides for the downloading of applets to a smart card or other device that already has a virtual machine. However, while this provides applets and the associated functionality as needed, it does so for cards that already have the virtual machine required to run the applets.

SUMMARY OF INVENTION

The present invention increases the potential uses of portable mass storage devices while minimizing the cost of manufacture and usage. The present invention allows the devices to run a variety of specialized software applications, but the cost of those applications will only be borne if the user chooses to utilize the functionality of those applications. In other words, the cost associated with the potential uses is only incurred if the potential is realized. This is an advantage for the both the manufacturer and the consumer. The manufacturer can increase product functionality and market penetration while not having to absorb or pass on costs for features that may be desirable to only a certain subset of consumers. Consumers who wish to utilize the features can pay for them as necessary, whereas those that do not wish to utilize the functionality need not pay for something they do not want or need.

A virtual machine is very useful in a portable mass storage device, because with the virtual machine in place, a larger variety of applications are available for usage than would otherwise be available to run directly on the device. This is because a virtual machine offers independence from any particular processing platform. A virtual machine is a self-contained operating environment that is executed by a microprocessor, but behaves as if it is a separate computer. A virtual machine application will execute and run the same way in that virtual machine, no matter what kind of processor and operating system the virtual machine is running on.

While prior solutions have incorporated a virtual machine into a memory card, the cost of the virtual machine had to be borne by the manufacturer and consumer regardless of whether the consumer wanted or needed the virtual machine. While this is acceptable in devices that are intended primarily to be used as transactional cards or "electronic wallets," it is not ideal in a portable mass storage device that may initially or primarily be used for other purposes. With the present invention, the license fee for the virtual machine need only be paid for if the user wishes to use an application that requires the presence of the virtual machine or machines. Thus, the cost of the underlying mass storage device can be kept to a minimum, and the add-on applications and virtual machine can be paid for only if necessary or desired. The virtual machine can be activated at any time during the life of the device, and payment will be made only if it has become active. The machine can also be loaded into the card at any time, alone, or in combination with an application that utilizes the machine. In certain preferred embodiments, when a virtual machine is needed, the installation of the virtual machine will take place without the knowledge of the user behind the scenes as part of the activation of the virtual machine or of the higher level application.

The present invention allows for payment of license fees only when the programs requiring the fees will be used. This makes it possible to incorporate these programs in environments where it would otherwise be infeasible. This is particularly useful given the large and diverse selection of applications that can be implemented in a small device such as a mass storage type memory card.

The present invention allows a user to quickly and easily select, activate, and pay for only the programs he wants. This keeps the basic device affordable for all, while at the same time allowing for customized applications to be used by those who find them desirable.

Integrating a virtual machine with the underlying firmware that runs the portable mass storage device is not a simple task. This is especially the case in "secure" devices that must limit access to protected content. In such devices, the firmware of the device is responsible, at least in part, for safeguarding the content. It thus limits access to read/write operations. As such, it is a target for those who wish to make unauthorized copies of protected content. Therefore, the underlying firmware must safeguard content from hackers yet still allow an application such as the virtual machine to access the content. In the scenario where the virtual machine may be loaded at any point (or an application running in the device that uses such content is turned on), the firmware must thus be able to run with or without the virtual machine (or application) and prevent malicious software from masquerading as a virtual machine (or application).

DETAILED DESCRIPTION OF THE PREFERRED EMBODIMENTS

As discussed in the background, portable flash memory based mass storage devices are widely used today to store large files and software programs. Due to the widespread usage of digital devices that rely on memory cards or pocket sized USB flash drives, many people already have one or more of these portable mass storage devices. The present invention increases the potential uses of these devices while minimizing the cost of manufacture and usage. The present invention allows the devices to run a variety of specialized software applications, but the cost of those applications will only be borne if the user chooses to utilize the functionality of those applications. In other words, the cost associated with the potential uses is only incurred if the potential is realized. This is an advantage for the both the manufacturer and the consumer. The manufacturer can increase product functionality and market penetration while not having to absorb or pass on costs for features that may be desirable to only a certain subset of consumers. Consumers who wish to utilize the features can pay for them as necessary, whereas those that do not wish to utilize the functionality need not pay for something they do not want or need.

Much of the software and other content that can be run and/or stored on a mass storage device requires payment of a fee to the owner or licensor. For example, a software program requires payment of a license fee to the creator, and content such as music, movies, photos or written works also requires payment to the reseller, creator, provider and/or licensor etc. One particular example of a software program that is particularly useful when implemented in a mass storage device is a virtual machine. This is because a virtual machine allows for the creation and execution of software that need not be tailored to the specificities of the underlying hardware platform. One example of a virtual machine is a Java based Virtual Machine, provided by Sun Microsystems, as described in the background.

While the virtual machine from Sun Microsystems will be described as an example, other virtual machines exist and yet others will be developed. A virtual machine is a self-contained operating environment that is executed by a microprocessor, but behaves as if it is a separate computer. A virtual machine application will execute and run the same way in that virtual machine, no matter what kind of processor and operating system the virtual machine is running on. This offers independence from any particular processing platform. Therefore, a larger range of software programs should be available to run on the virtual machine and underlying device than would otherwise be available without the virtual machine. The present invention can work with any virtual machine and the applications it makes possible.

Figure 1:
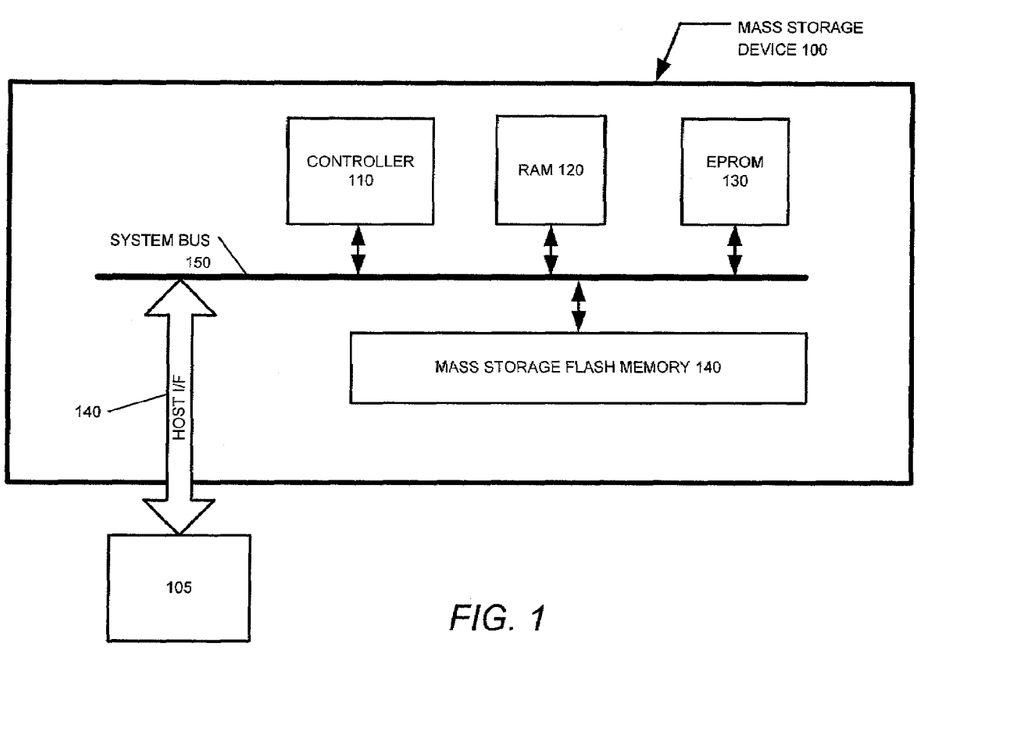
FIG. 1 is a schematic diagram of mass storage device 100.

The general architecture of a mass storage type memory card is shown in FIG. 1. The various components of mass storage device 100 are coupled together and communicate via system bus 150. Device 100 communicates to an external device 105, also referred to as host 105, via host interface 140. Host interface 140 comprises both logical and hardware components that transfer data back and forth between host 105 and device 100. If device 100 has the form factor of a mass storage memory card, the interface includes electrical contacts that would interface, for example, with the contact structure of a digital camera. If device 100 has the form factor of a USB device, host interface 140 includes electrical contacts and the necessary drivers to interface with a USB port. Controller 110 controls the device and manages the read/write operations and data distribution within the cells of the mass storage flash memory 140. Device 100 also includes random access memory ("RAM") 120 which may be a discrete component as shown or integrated within controller 110. Controller 110 executes firmware from RAM 120 that is stored in either ready only memory 130 or mass storage flash memory 140. Read only memory 130 may be electrically erasable and thus an EEPROM or an EPROM. The firmware is executed by the controller and controls the operation of the memory card. If the firmware is corrupted, the memory card will no longer function properly.

Mass storage device 100 preferably includes security measures. These measures would ensure that the state (e.g. inactive to active) of an application can only be changed by the authorized party. The state is controlled by the device firmware and firmware can check the state to validate a specific application is active and can be used. Those measures are also preferably implemented in both the hardware and software (firmware) of the device, and in certain embodiments encrypt the data stored in the device and transferred to and from the device. For more information on this type of secure mass storage device please refer to the following U.S. patent applications which are hereby incorporated by this reference in the entirety: U.S. application Ser. No. 11/053,273 entitled "Secure Memory Card With Life Cycle Phases" to Holtzman et al.; U.S. application Ser. No. 11/314,032 entitled "Memory System with in Stream Data Encryption/Decryption" to Holtzman et al.; and U.S. application Ser. No. 11/317,339 entitled "Secure Yet Flexible System Architecture for Secure Devices With Flash Mass Storage Memory."

Device 100 will be referred to as a memory card, one embodiment of the device, although as mentioned previously, device 100 may be in the form of a memory card, USB device or other form factor.

Figure 2:
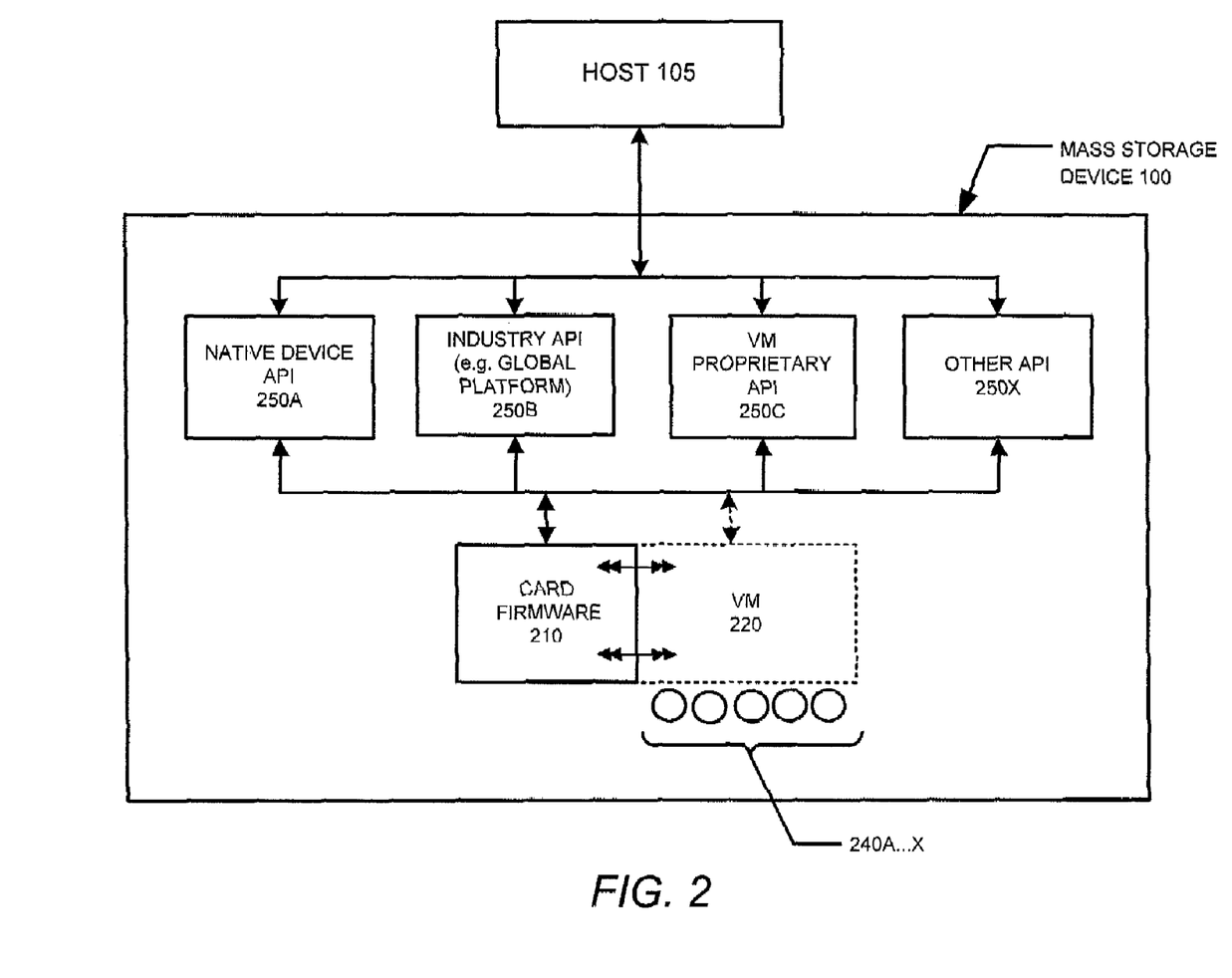
FIG. 2 is a schematic diagram of the software components of mass storage device 100 and host 105.

The firmware provides a path to the data of the card, some of which may be protected data. The integrity of the firmware that runs the controller is important, especially in secure cards. If the card is a secure card, for example, one that implements some form of digital rights management ("DRM"), one of the functions of the firmware is to limit access to protected content. DRM is a broad term used to describe a number of techniques for restricting the free use and transfer of digital content, and as such, some believe it is more aptly described as "digital restrictions management." FIG. 2 illustrates some of the software components of device 100, including the firmware. Virtual machine 220 contains functionality not present in the base card firmware 210, but will also be able to access the content in the flash memory. Therefore, in a sense it can also be thought of a type of firmware in the card, and must be fully integrated and compatible with firmware 210. Card firmware 210, must therefore is implemented in such a way that it can function robustly with or without the presence of VM 220. Likewise, VM 220 is implemented in such a way that it functions with card firmware 210. The design aspects implemented in the code of firmware 210 that allow it to be integrated with VM 220 can be thought of as a "hooks" within the firmware 210. These hooks and the compatibility they entail are represented by the double arrows between firmware 210 and VM 220. Applets loaded within card 100 can communicate with the firmware via VM220 and can provide any number of different software applications on the card. These applets 240A . . . X run on the virtual machine and therefore need not be tailored to specifics of controller 110 and the other hardware components of device 110. This opens the device to a library of different software applications that would otherwise not be compatible with the card.

As seen in FIG. 2, host 105 must communicate to firmware 210 (including VM 220) through an application programming interface ("API"). Any number of API's 250A . . . X can be implemented in the card. This includes the standard or native device API 250A, an industry standard or widely accepted API 250B such as the Global Platform API, proprietary API's 250C (such as an API tied to VM 220, e.g. an API for the Java virtual machine, or an API for or one of applets 240), and any other API 250X. VM 220 must have the proper API in place to function, and therefore one way to activate a particular virtual machine is by activating and/or loading an API that is compatible with the particular virtual machine. The VM can of course be activated directly with various other triggers. The VM is a type of firmware, as will be discussed later with regard to FIG. 9. The various methods of activation will be discussed below.

Whatever the application of the card, adding the functionality of the previously discussed virtual machine requires integration with the other firmware of the card. Whether the virtual machine and its various applets are integrated with the firmware before or after the card leaves the factory, the card must operate seamlessly. In the scenario where an applet is field downloaded, the contents and nature of the applet cannot be easily verified, if at all. The basic firmware of the card must therefore be flexible enough to accommodate the field download and the data access the applet will require, while at the same time it must be robust enough to function even with a poorly written applet. Moreover, in the event the applet aims to defeat the DRM of the card, the firmware must protect the data from the applet yet continue to provide content to authorized users.

Unlike a Smart Card that is purpose built to safeguard a small amount of highly protected transactional data, a mass storage type memory card must provide frequent access to very large libraries of content. This user content is always in flux during the life of the card, as are the applications that the card may encounter. The firmware and the hardware of the card accommodate user desires for new applications and allow them to be downloaded in the field (or at the factory) while always safeguarding the contents of the card. This is not a simple task.

Figure 3A:
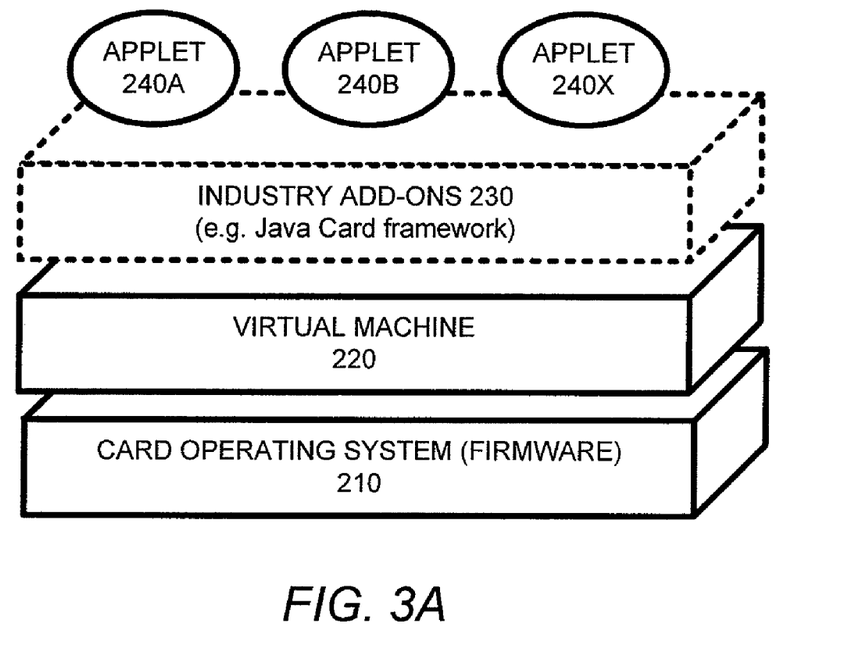
FIG. 3A is an illustration of the software components of a mass storage device according to an embodiment of the present invention.

FIG. 3A is a representation of some of the software components in card 100. Running within the card are the various applets 240A-X. The preferred virtual machine 220 is the Java Card™ virtual machine, and in the case of the Java Card™ or other Java virtual machine, the Java Card™ framework would be also be present if required or desirable based upon the particular applets and virtual machine 220. All of these components run on the card operating system or firmware 210. In this case Java Card™ Framework and other industry add-ons 230 and Java Virtual Machine 220 run on the card operating system 210.

Figure 3B:
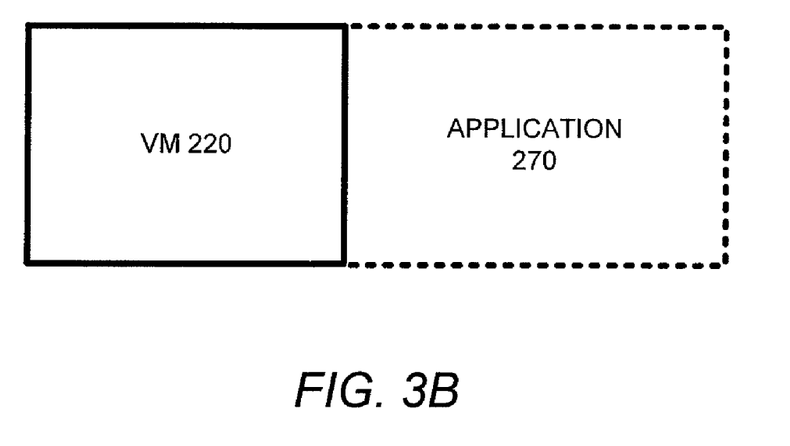
FIG. 3B is an illustration of a downloaded application according an embodiment of the present invention.

FIG. 3B illustrates the software components or "package" that can be loaded into the card and activated at any time, and function as part of the firmware and system of the present invention. The package can include not just the virtual machine 220, but also (optionally) one or more software applications 270. The underlying firmware 210 is equipped to function with the additional software of VM 220 and application(s) 270. Any software application 270 that runs on a virtual machine can be loaded into the card at any time. The dotted line serves to indicate that VM 200 may be loaded with or without application(s) 270 and that installation of the application need not take place simultaneously with that of the VM. Any fees associated with the components of the package need only be paid for when both i) the package is present in the card, and ii) the package is activated.

Figure 4A:
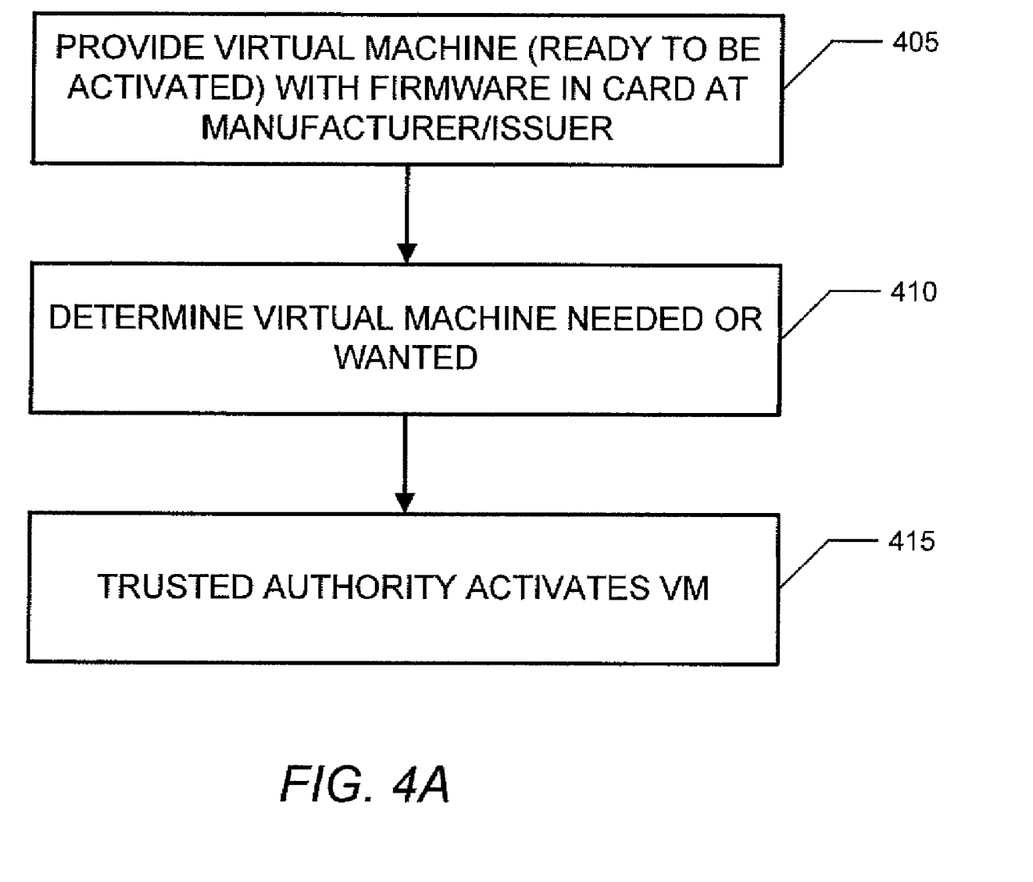
FIG. 4A is a flowchart of a first provisioning scenario according to the present invention.
Figure 4B:
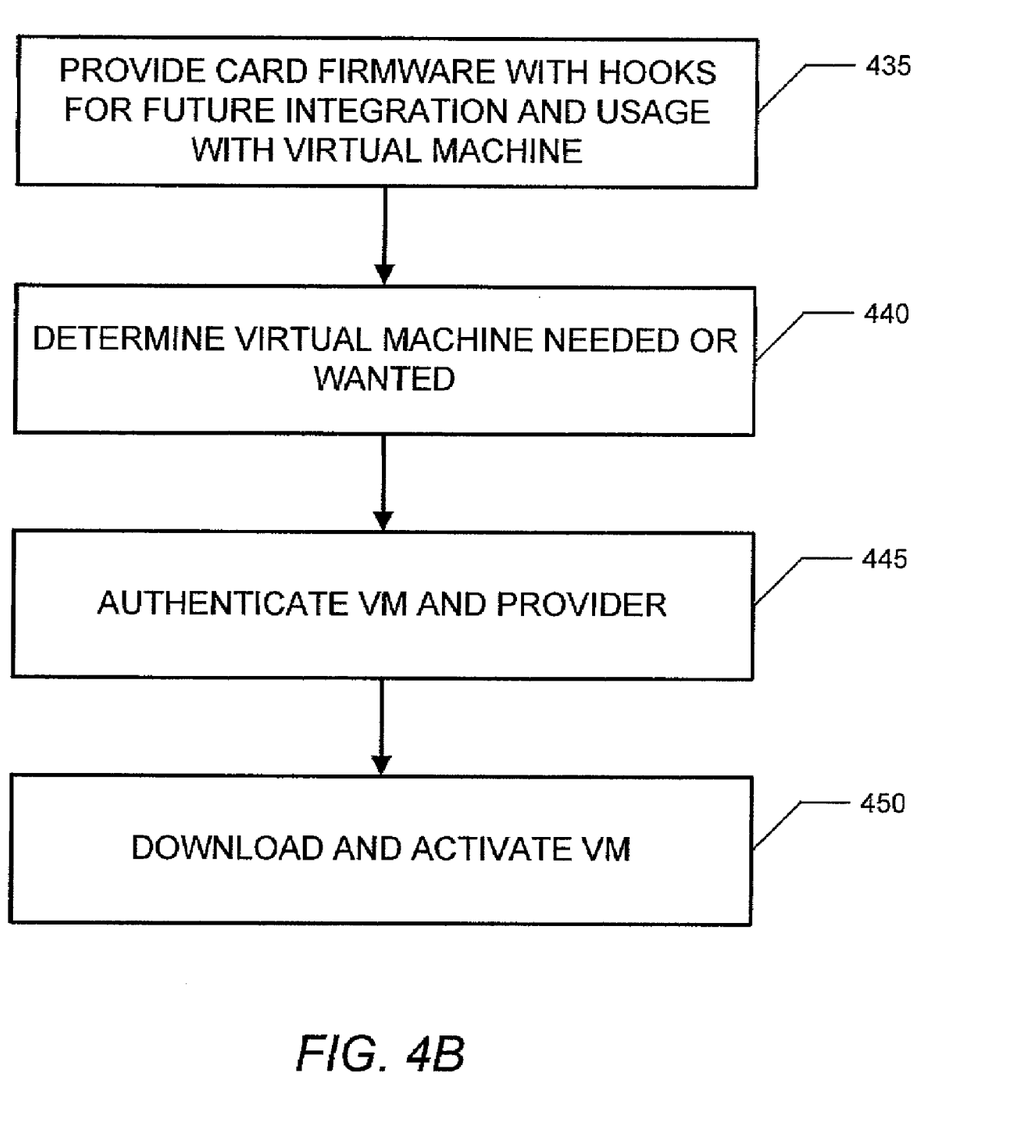
FIG. 4B is a flow chart of a second provisioning scenario according to the present invention.
Figure 4C:
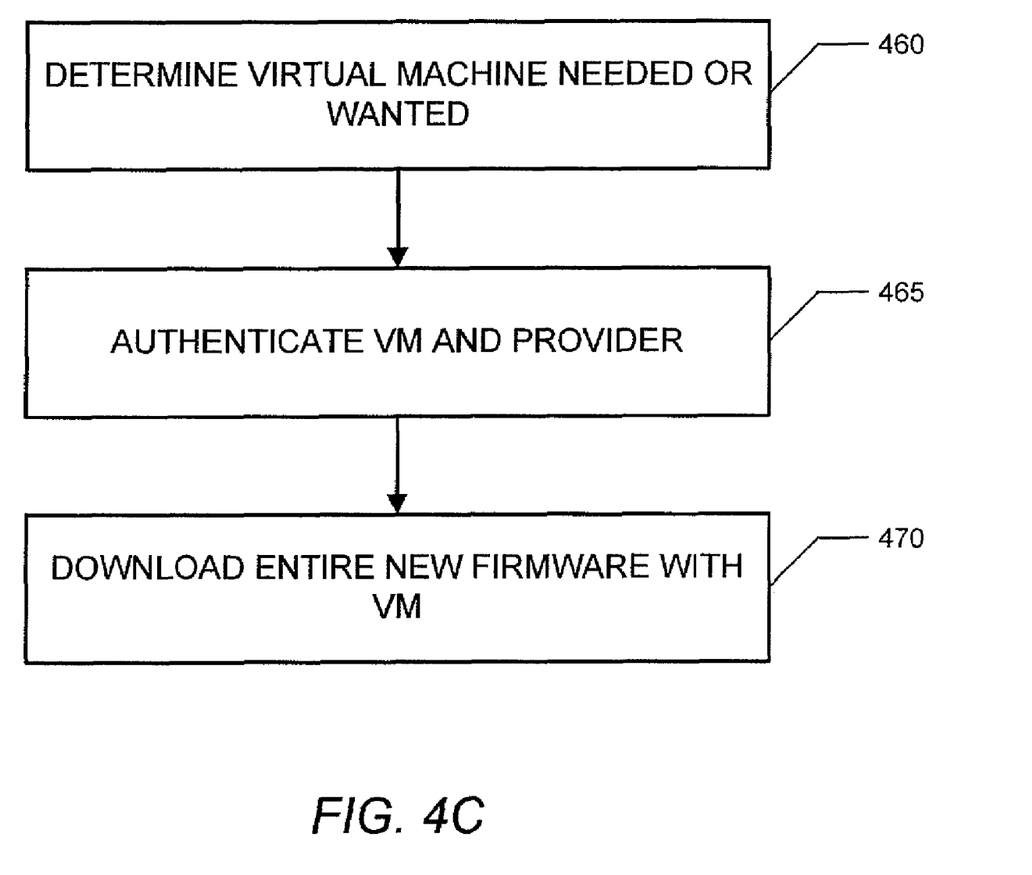
FIG. 4C is a flow chart of a third provisioning scenario according to the present invention.

The package seen in FIG. 3B may be provided to the user in a number of ways. It may be provided in the card at the time of sale, as seen in FIG. 4A. In this case the package must be activated in the "field" before it can be used. It may alternatively be "field" downloaded by the user, either as a complete package or piece by piece, as seen in FIG. 4B. As another method, new firmware 210 may be loaded into the card, as seen in FIG. 4C. This firmware download would also include all or part of the package seen in FIG. 3B. In one embodiment this means the firmware 210, VM 220, applets 240 seen in FIG. 2 would all be loaded in the process of a firmware update. These basic methods are illustrated in the flowcharts of FIGS. 4A, 4B, and 4C, which will be described below.

As mentioned previously, the virtual machine and applet or application need to be active or activated in order to be utilized. Of course, although it is not preferred in many scenarios, there may be no security measures necessary to download active components. This would likely, but not necessarily, be suitable in a secure or trusted environment where there is limited distribution of the cards. Also, in some embodiments, the security may be part of the download process and there need not be additional activation required. In other words, the component can be downloaded in an activated state, given that the user has been authorized to download in the first place, or the activation can take place as part of the download sequence.

Card 100 has an activation manager that receives and validates the activation command. The activation manager can be part of firmware 210 or can be considered a separate software module. The activation manager turns on and turns off applications or operating system features. This activation is preferably done securely, for example on top of a secure channel. In one embodiment, the activation manager would activate the package if it receives the correct code. The activation manager would receive the code, check it against a server that would validate the code, or check it against an encrypted version of the code stored within a memory of the card. The activation manager also keeps track of failed activations, and in some embodiments limits the number of failed attempts and may lock the card if the number is exceeded.

The code may be based upon different parameters and calculated in any number of ways. The code may also be a simple number expected to turn on the matching application. The code could be generic for activation and may also be associated with and/or based upon an application ID, which is a number uniquely associated with a particular application. The code may be based in part on a card unique ID, which is a number associated only with a particular card. The code may also have parts that specify the application, whether or not the application should be activated or de-activated, and the activation code itself. The code could also specify or comprise a specific application state such as inactive, active, suspended, or revoked. It may also specify and provide access to other various permissions necessary, for example different permission levels in a DRM scheme. The code can also be based on or include some or all aspects of all of the above schemes.

The code could also be part of a symmetric or asymmetric cryptographic authentication scheme. For example, in a symmetric scheme the code could be a type of one time password ("OTP"), which is well known in the art. In this case, both the card and a verification server would have the same seed, and independently create the code or OTP based upon that seed and any number of selected algorithms. The code or OTP is incremented or updated at regular intervals, and at any given moment, the OTP calculated in the card can be verified against the OTP calculated by the verification server. With an OTP scheme, if two cards were originally loaded with the same seed, if different algorithms are used in the two cards to increment the password (within the card and the server), even if the seed or one time password value in one card is compromised it cannot be used to hack into another card. In one example, the activation code or OTP is a function of the card ID, card type, application ID, and the OTP seed. The card type can be any well known card type such as the compact flash card, SD card, mini SD card, MMC card, transflash card, XD card, Memory Stick etc. . . . or may be a USB flash drive.

In an embodiment where the activation code comprises or is based upon (a function of) an OTP, the OTP and/or the code may be used to turn on or turn off an application or software layer. If the OTP or code (generated by a remote server or other device) sent to the card and compared against an OTP generated by the card to verify the activation code or OTP. If it is verified as correct, the application or software layer may be turned on or off. Use of the OTP for these purposes is advantageous because the value can only be used once, and thus cannot be used for multiple activations or passed on and used in an unauthorized fashion. In certain embodiments, the application ID of the application to be activated may also be used to generate the activation code or OTP. In this way, the OTP will be specific to a certain application.

As mentioned previously, in certain embodiments the same seed may be used for multiple cards. At the base of the OTP calculation is the seed. Again, the activation code or OTP is a function of the card ID, card type, application ID, and the OTP seed. This allows the same secret seed to be loaded into multiple cards, which reduces the number of records on the server database. At the same time, because of the different algorithms that may be a function of one or more of the card ID, card type, and application ID, may be used, unique OTPs and activation codes can be generated thus providing a high level of security.

Figure 6:
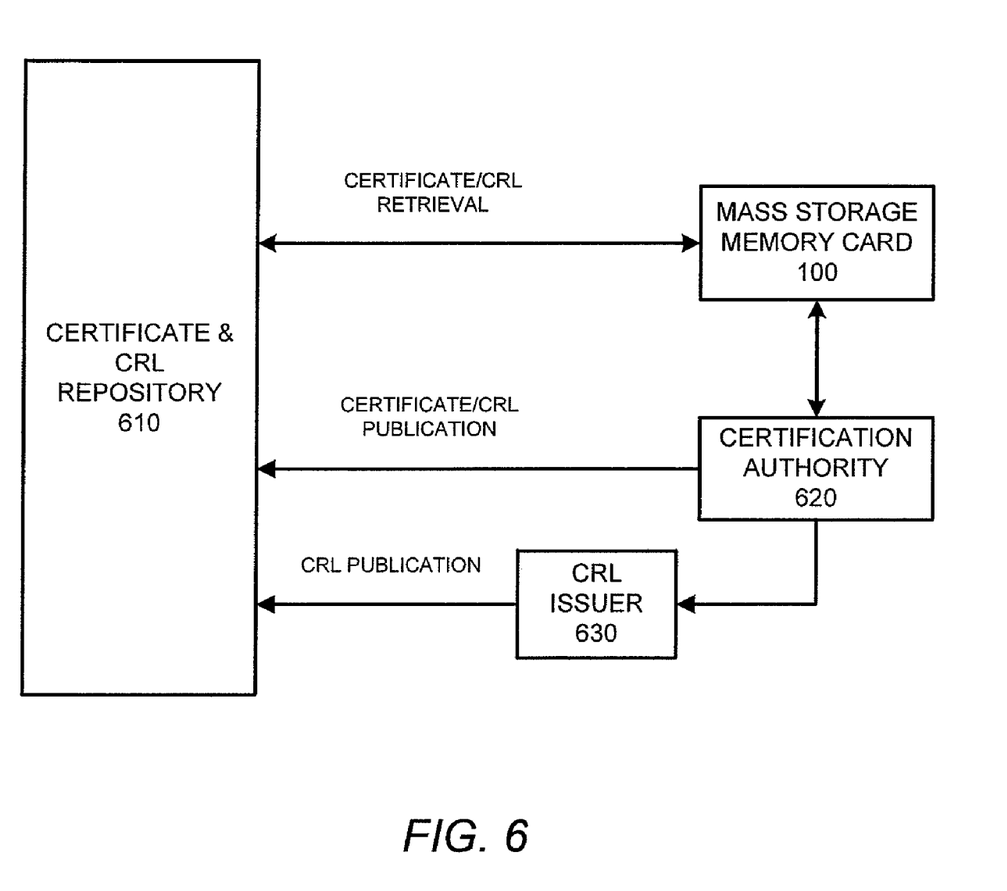
FIG. 6 illustrates public key infrastructure and mass storage device 100.
Figure 7:
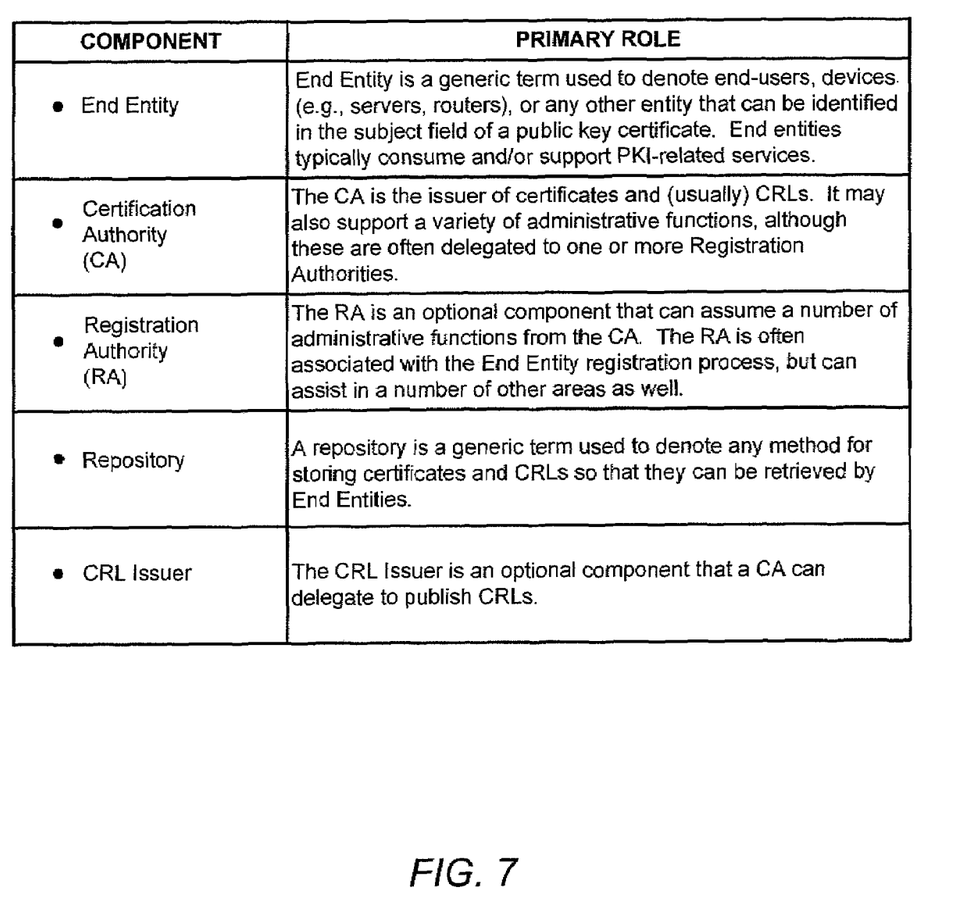
FIG. 7 is a table describing some components of public key infrastructure.

The most common asymmetric schemes involve a Public Key Infrastructure (PKI), in which a device or entity possesses two keys, the Private Key and the Public Key, that are cryptographically related such that data that is encrypted with one key can be decrypted with the other, and there is no way to mathematically derive the Private Key from the Public Key. In such a scheme, the Public Key is freely distributed, and the Private Key is kept secret by the owning entity. Authentication of an entity is achieved by performing a challenge/response sequence in which it is required to prove ownership of the Private Key by decrypting a message that was encrypted using its Public Key. An embodiment of the invention using the PKI is shown in FIGS. 6 and 7, which will be described later.

Furthermore, in one embodiment, aspects of a symmetric scheme are combined with aspects of an asymmetric scheme. In one example of such an embodiment, the OTP would in one stage be used to verify the card, and in another stage, a challenge/response dialogue would be used.

Having discussed the activation process, we will now return to the flowcharts of FIGS. 4A, 4B, and 4C that illustrate aspects of both download and activation.

FIG. 4A illustrates the process in which activation of a loaded virtual machine is to be carried out. IN step 405 of FIG. 4A, the virtual machine is provided by the issuer or provider of the card at some point before the card is sold to the user. This may be at the time of manufacture or at some point thereafter, and the firmware of the card will also be present. The virtual machine will be in a dormant or inactive state, that is to say it will not be available for use by the consumer. Therefore, it should not be necessary to pay a license fee for the (unused or inactive) virtual machine. Preferably, the consumer will not be aware that it is present on the card before it is activated or "unlocked." The virtual machine may be any type or brand of virtual machine. Some examples of currently available virtual machines are: java; MULTOS; Java Card™; embedded linux; embedded java; dot.net; and Windows CE. Different virtual machines may be required to support different applets, and multiple VM's may therefore be loaded into the device. The device firmware manages the availability of resources need for the different VM's and applets.

In step 410 the user, card, or server of the system determines that the virtual machine is needed or wanted. Next, in step 415, a trusted authority activates the virtual machine. It is at this point that any license fee associated with the virtual machine would need to be paid. In the public key infrastructure, a trusted authority is often referred to as a certification authority. The certification authority 620 is shown in FIG. 6.

FIG. 6 shows an embodiment that utilizes the public key infrastructure for verification/authorization of credentials. Since transactions can be no more secure than the system in which they occur, the most important element becomes establishing a way for correspondents to locate each other and have confidence that the public key they use truly belongs to the person (or machine) with whom/which they wish to communicate. A Public Key Infrastructure is designed to provide this trust. Using a data element called a digital certificate or public key certificate, which binds a public key to identifying information about its owner, the infrastructure is designed to create the binding, and manage it for the benefit of all within the community of use. Once the credentials are verified, the package can be activated with a code or OTP as described above. Alternatively the credentials themselves or verification thereof would be sufficient for verification/authorization of credentials, allowing or triggering activation.

Using a combination of secret key and public key cryptography, PKI enables a number of other security services including data confidentiality, data integrity, and key management. The foundation or framework for PKI is defined in the ITU-T X.509 Recommendation [X.509] which is incorporated by this reference in its entirety.

End Entities are sometimes thought of as end-users. Although this is often the case, the term End Entity is meant to be much more generic. An End Entity can be an end-user, a device such as a router or a server, a process, or anything that can be identified in the subject name of a public key certificate. End Entities can also be thought of as consumers of the PKI-related services. In the present invention, as seen in the embodiment shown in FIG. 6, the end entity is the mass storage device 100 and its user.

Public keys are distributed in the form of public key certificates. The CA 620 is the foundation of the PKI since it is the component that can issue public key certificates. The public key certificates are sent to device 100 and to repository 610. Public key certificates are digitally signed by the issuing CA (which effectively binds the subject name to the public key). CAs are also responsible for issuing certificate revocation lists (CRLs) unless this has been delegated to a separate CRL Issuer 630. CAs may also be involved in a number of administrative tasks such as end-user registration, but these are often delegated to the Registration Authority (RA) which is optional and not shown in FIG. 6. In practice, CAs can also serve as the key backup and recovery facility although this function can also be delegated to a separate component. CAs are often thought of as the "source of trust" in a PKI. In an embodiment utilizing the public key infrastructure, CA 610 will indicate that device 100, and the server that will download the package can be trusted. This trust will be used for download, activation, and payment purposes. FIG. 7 is a table describing the components of FIG. 6, and is provided as a quick reference.

FIG. 4B is another process of providing the virtual machine, alone or as part of a larger software package. In step 435 the card firmware 210 is provided. This firmware has "hooks" for future integration and usage with a virtual machine, or in other words is designed to be compatible with a virtual machine. The virtual machine compatible firmware is preferably provided at the time of manufacture of the card, but may also be loaded at any time during the life of the card. The firmware has security mechanisms designed to limit access to certain types of data on the card. This includes the security mechanisms themselves within the firmware and to protected content stored in the memory of the card. Before the virtual machine is installed or activated, the (security mechanisms of the) firmware does not allow software applications running in or out of the card to access the protected data. However, the firmware is also operable to detect the virtual machine and let the virtual machine access certain of the protected data once it is installed and activated. In other words, the firmware can be thought of as having different operating states, one for use without the virtual machine, and one for use with the virtual machine. In both states, the firmware must protect and limit access to data on the card, including the firmware itself. In the second state, the firmware, must allow the virtual machine to read and write data, while not permitting any malicious applications unauthorized read/write access.

Next, in step 440, after the card has left the manufacturer, a user or middleman, or the card itself, determines that a virtual machine is wanted or needed. Thereafter, the virtual machine and its provider are authenticated in step 445. This can be a symmetric and/or asymmetric authentication as previously described. In step 450, the virtual machine is downloaded into the card and activated. It is at this point that any license fee associated with the virtual machine would need to be paid. Once activated, payment would be triggered.

FIG. 4C is yet another process of providing the virtual machine, alone or as part of a larger software bundle. In step 460, the user or card determines that a virtual machine is needed or wanted. Next, in step 465, the virtual machine and its provider are authenticated in step 445. This can be a symmetric or asymmetric authentication as mentioned previously. In step 470, a new copy or version of firmware 210 with a virtual machine 220 is downloaded into the card. Additional applets 240 or other programs can optionally be loaded at the same time.

Figure 5:
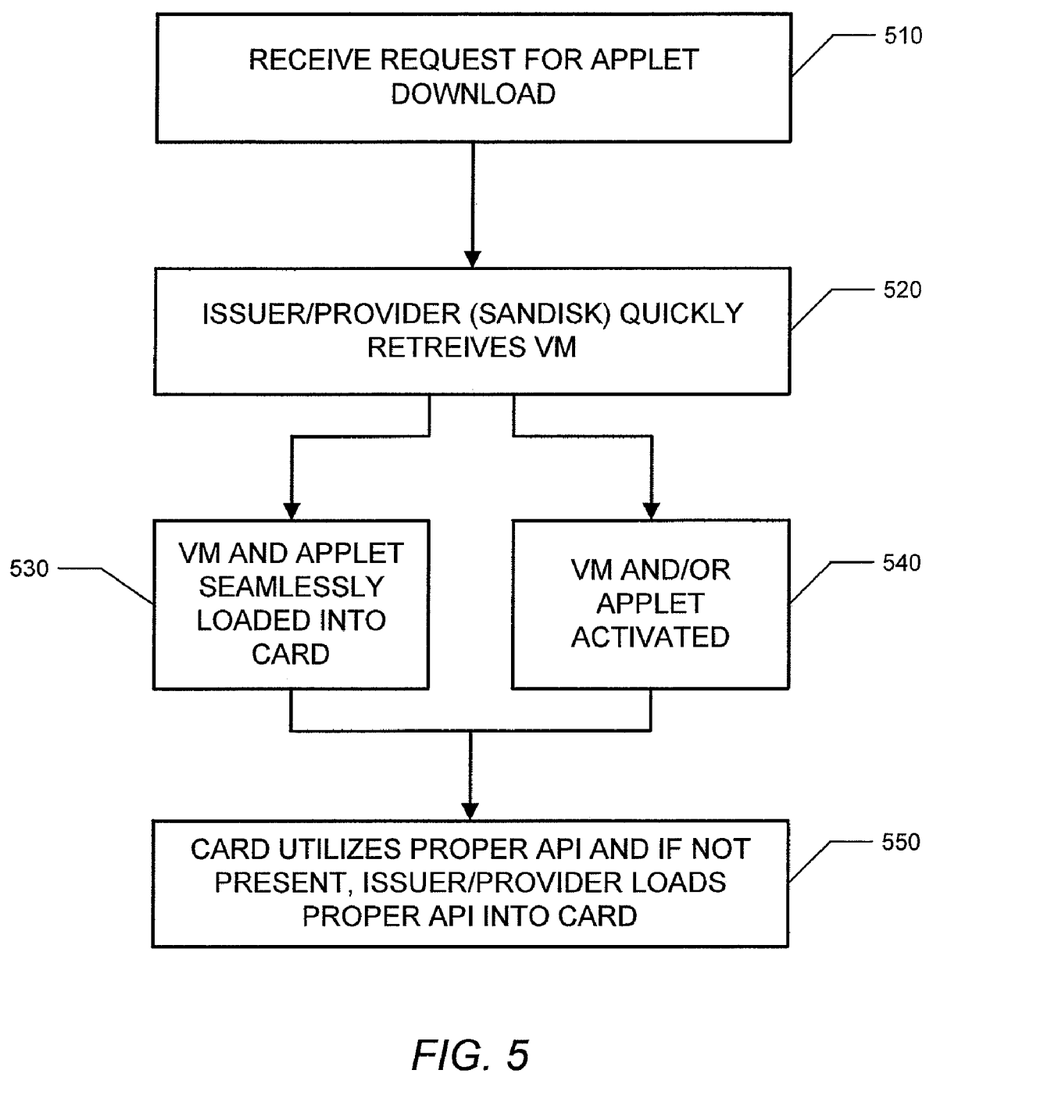
FIG. 5 is a flow chart illustrating application protocol interface management according to an embodiment of the present invention.

FIG. 5 illustrates API management with virtual machine download. In step 510, a request is received for an applet download. This request can be made of a server from any intelligent device, via any network, including the Internet. The server can be operated by the issuer or provider of the card, or any third party. The issuer of the card may be the manufacturer or its representative, while the provider may be any entity that handles, distributes, or sells the cards. The server receiving the request of step 510 then notifies the issuer or provider of the card of the request, if the issuer or provider did not directly receive the request. In step 520 the issuer or provider quickly retrieves a virtual machine (if) needed for the applet to run. Next in step 530 the virtual machine and applet are seamlessly loaded into the card. This means that the user need not (but may) know that the virtual machine has been retrieved and loaded into his card. In step 440, which may occur before, after, or simultaneously with step 540, the virtual machine and applet are activated. In step 550, the card selects and utilizes the proper API for the virtual machine and applet. If the proper API is not present, the issuer or provider loads the proper API into the card. Again, as in step 520, the user preferably need not (but may) know that the API was loaded into the card. In summary, the process is made as fast and painless as possible for the user. Once the request is made for the applet, the applet and all the necessary software to enable the applet to run can be automatically loaded in a very rapid manner without the user knowing the various steps that may be involved in loading his applet and making it work. As mentioned previously, providing the proper API is one way to activate a virtual machine and/or applet.

Fee and Royalty Collection and Distribution

Figure 8:
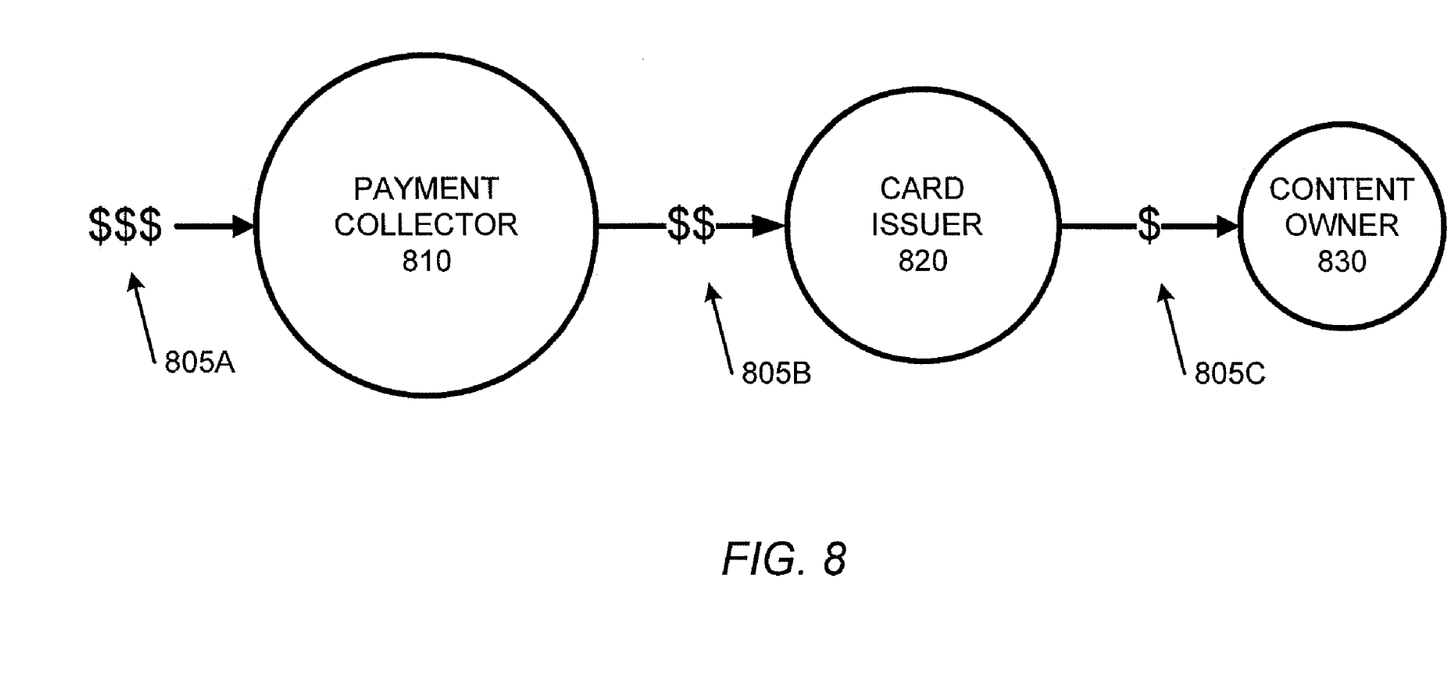
FIG. 8 is an illustration of revenue flow according to an embodiment of the present invention.

Once the virtual machine, applet, or other software application has been activated, the license fee must be paid for the application. If for instance, an applet involves digital rights management ("DRM") used to control secure content loaded to the card, a royalty may also be required for the content. In any case, the present invention can be used to pay for any type of royalty or license payment. FIG. 8 depicts a system for payment of the fees to and from various entities. Consumer fee 805A is collected by payment collector 810. This would preferably involve a secure service offered on the Internet. The payment collector 810 would retain some portion of the fee for its services and transfer the rest of the fee to the device issuer 820. For example, if the content or program was loaded onto an SD card issued by SanDisk, SanDisk would be a card issuer 820 and would receive portion 805B of fee 805. The issuer would then retain some portion of fee 805 and transmit portion 805 C to content owner or licensee 830. In the embodiments thus far described, the payment for the Java virtual machine license as well as for different applets running on the virtual machine could be paid. The system could also be used more generally to pay for other types of content that require a license. This payment system would also be quite useful in payment for content and for the software necessary to render the content to the user of the device.

Security

In addition to securely activating the virtual machine, device 100 also implements other security measures. Before the virtual machine will be stored in the flash memory, the card may require that it be signed by a trusted authority described previously. In addition, various encryption techniques can also be implemented so that the virtual machine (or other software application) cannot be tampered with, surreptitiously activated, or illegally copied and installed on devices. The VM could be encrypted with various well known hash functions, or alternatively with a device unique key.

This encryption can be accomplished with software and/or hardware. This can entail the usage of MAC values, SHA-1 values, or hash values. The basics of these encryption/decryption techniques are well known, and need not be described in detail here.

Figure 9:
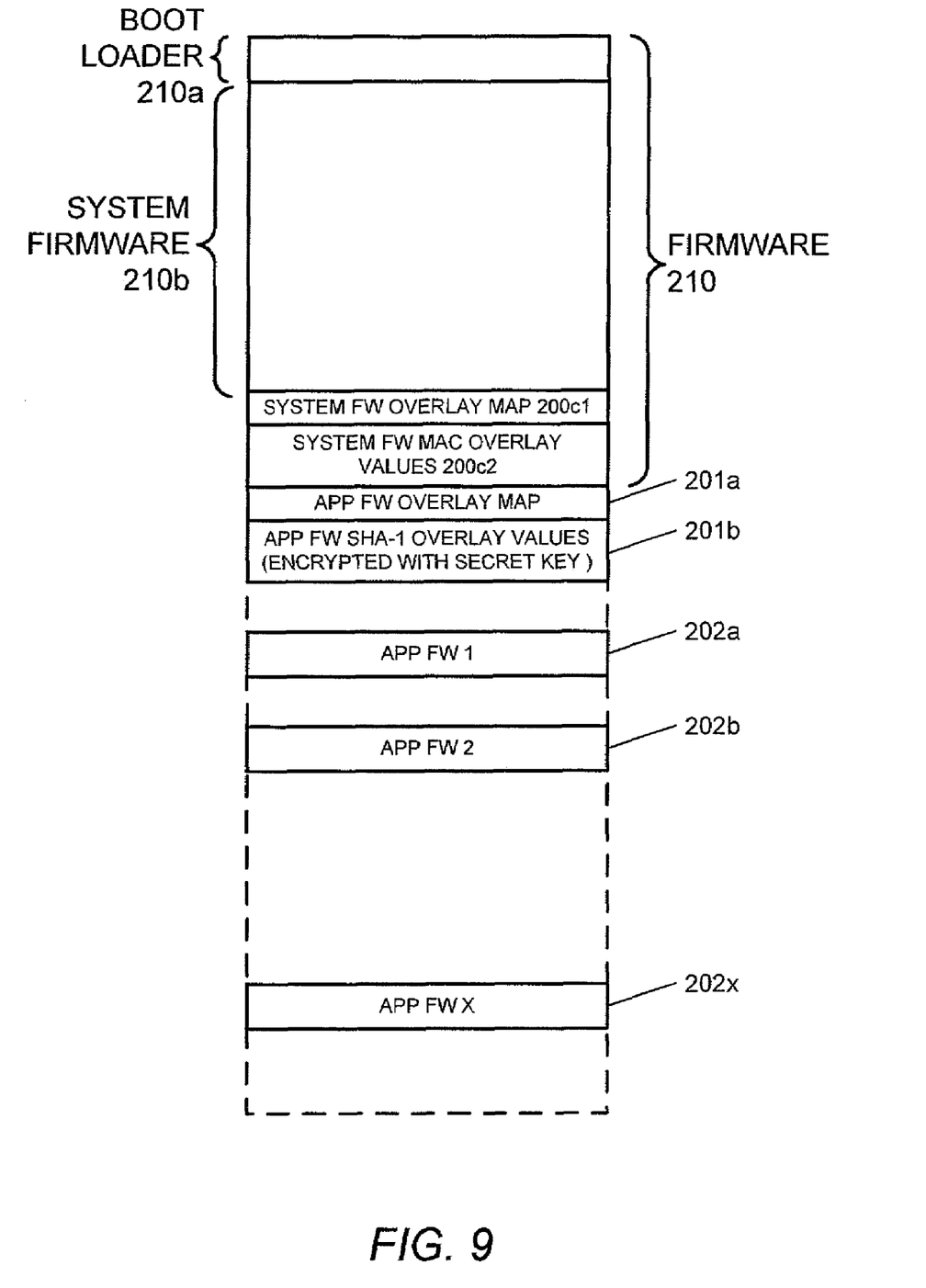
FIG. 9 is an illustration of a portion of the memory space of flash memory 140.

In one embodiment the encryption is performed with an encryption engine implemented in the hardware of the controller. The hardware of the encryption engine encrypts the incoming data of the application, on the fly, as it is loaded into the memory of the card. The controller is used to create hash values that are particular to the controller and the association with the controller serves as a type of signature of the controller. This signature is thereafter verified before the application will be executed. Implementing the encryption engine at least partly in the hardware (rather than entirely in firmware) of the controller results in a robust device that is very hard to crack. This is because the controller cannot be replaced with a substitute controller (that would have a different signature), which is a common way to crack the security of the device. Nor can the signature of the controller easily be forged. As seen in FIG. 9, the firmware 210 may have a boot loader portion 210a, a system portion 210b, and various MAC values, SHA-1 values, or hash values for the firmware, which may be divided into segments or overlays that can individually be loaded into RAM memory for execution. For further information on this and other aspects of encryption techniques that are utilized in certain embodiments of the present invention, please refer to the applications to M. Holtzman et al., that are incorporated by reference in the entirety.

Various firmware applications can be seen stored in the flash memory space shown in FIG. 9. The virtual machine and applets can be considered firmware applications. For example, APP FW 1, numbered 202a, may comprise the virtual machine, and an applet may be comprised by/within APP FW 2, numbered 202b. If these pieces of firmware are divided into overlays, an application firmware overlay map 201a would indicate where the various pieces of the application firmware "puzzle" are stored. Hash values, SHA-1 values, or MAC values of the overlays are stored in an encrypted format themselves in table 201b within the flash memory. These values may themselves, in turn, be encrypted, and may in certain embodiments be encrypted with device specific hardware encryption techniques as mentioned previously. In certain embodiments, space will be reserved within the flash memory for the virtual machine in order to facilitate integration and operation with the other firmware of the card. This is especially important in a secure card, where the security of the card, provided in part by the firmware, could otherwise be compromised by the virtual machine or any other application running on the card and accessing data stored therein.

While embodiments of the present invention have been shown and described, changes and modifications to these illustrative embodiments can be made without departing from the present invention in its broader aspects. Thus, it should be evident that there are other embodiments of this invention which, while not expressly described above, are within the scope of the present invention and therefore that the scope of the invention is not limited merely to the illustrative embodiments presented. Therefore, it will be understood that the appended claims set out the metes and bounds of the invention. However, as words are an imperfect way of describing the scope of the invention, it should also be understood that equivalent structures and methods while not within the express words of the claims are also within the true scope of the invention.

It is claimed:

1. A mass storage type memory card comprising:
    flash memory;
    a controller; and
    firmware that controls read and write operations of the flash memory, wherein the firmware comprises security routines within the firmware that limit access to the read and write operations;
    wherein the firmware is configured to selectively operate in either of a first state of operation or a second state of operation, wherein in the first state of operation, the card operates without an activated virtual machine and in the second state of operation, the card operates with an activated virtual machine; and
    wherein while the card operates in the second state of operation, the security routines of the firmware grant the virtual machine access to data from read and write protected data, and wherein a license fee associated with the virtual machine is paid when the card operates in the second state of operation.

2. The mass storage type memory card of claim 1, wherein memory space for the virtual machine is reserved within the flash memory.

3. The mass storage type memory card of claim 1, wherein the card operates in the first state until a virtual machine is loaded into the card, and thereafter operates in the second state.

4. The mass storage memory card of claim 3, wherein an applet is loaded with the virtual machine.

5. The mass storage memory card of claim 3, wherein the applet comprises a digital rights management application.

* * * * *